(No Model.)
F. W. GOODYEAR.
MECHANICAL MOVEMENT.
No. 289,645. Patented Dec. 4, 1883.
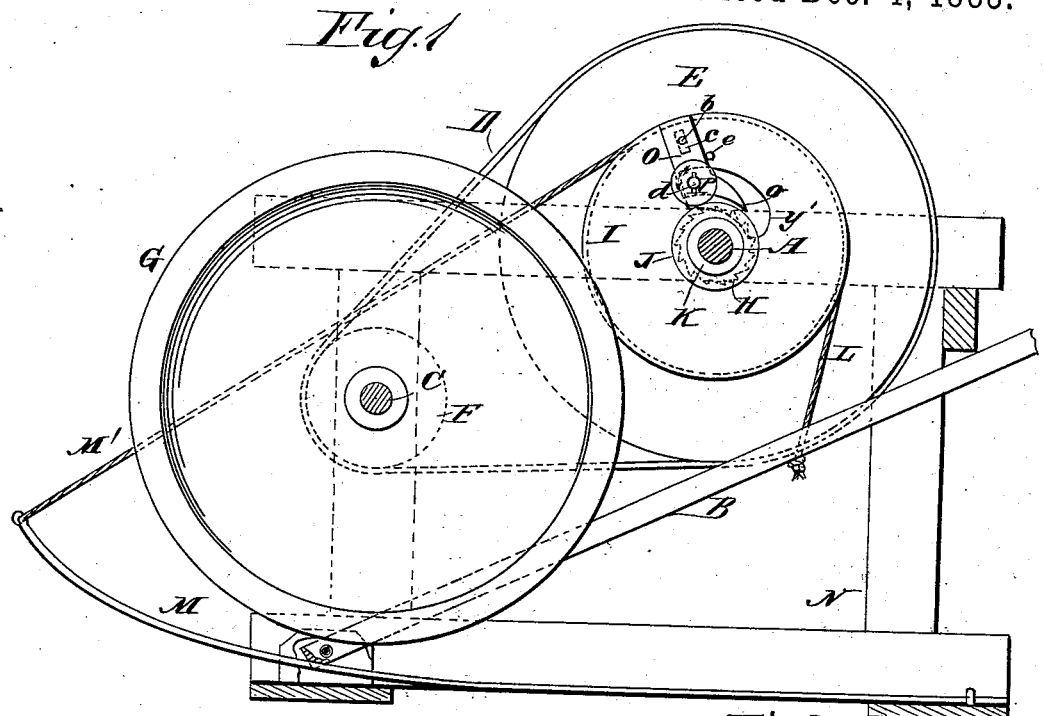
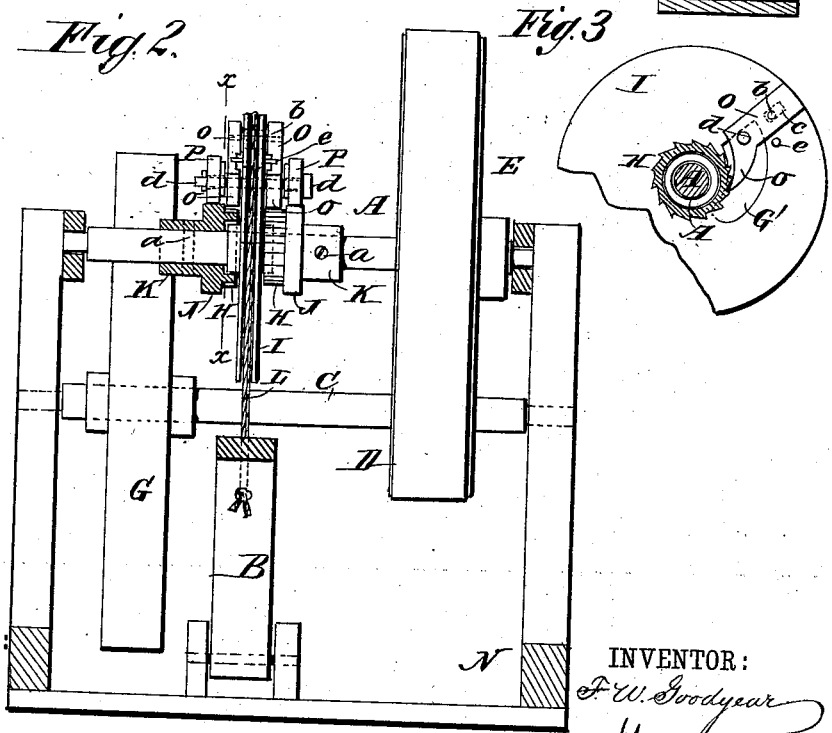
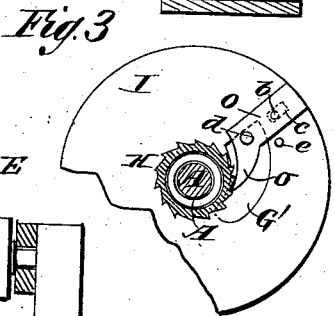
WITNESSES:
F. McArdle
C. Sedgwick
INVENTOR:
F. W. Goodyear
BY Munn & Co.
ATTORNEYS.

UNITED STATES PATENT OFFICE.

FRANCIS W. GOODYEAR, OF SPRINGFIELD, MASSACHUSETTS.

MECHANICAL MOVEMENT.

SPECIFICATION forming part of Letters Patent No. 289,645, dated December 4, 1883.

Application filed October 16, 1883. (No model.)

*To all whom it may concern:*

Be it known that I, FRANCIS W. GOODYEAR, of Springfield, in the county of Hampden and State of Massachusetts, have invented a new and Improved Mechanical Movement, of which the following is a full, clear, and exact description.

This invention relates to certain improvements in mechanical movements for converting reciprocating into continuous rotary motion, applicable to various hand and foot power machines.

Reference is to be had to the accompanying drawings, forming part of this specification, in which similar letters of reference indicate corresponding parts in all the figures.

Figure 1 is a side elevation of my invention. Fig. 2 is a sectional front elevation of the same, and Fig. 3 is a detailed sectional elevation taken on the line $x$ $x$ of Fig. 2.

A represents the shaft, which is revolved by power applied to the reciprocating lever or treadle B. In this instance this shaft A is arranged to revolve shaft C through the belt D, passing over pulleys E F, secured, respectively, on shafts A C, and the shaft C has secured to it the balance-wheel G, for maintaining an even motion; or the wheel G may be used as a pulley for communicating motion to other machinery. On the shaft A is placed loosely between the ratchets H H the grooved pulley I. The ratchets H H are each made integral with a smooth-surfaced annulus, J, and collar K, through which the set-screws $a$ pass for securing them to the shaft A. The treadle or lever B is attached to the pulley I by the cord L, and the free end of the spring M, which is made fast at its other end to the frame N of the machine, is attached by cord M' to the top of the said pulley I, so that when the lever or treadle B is depressed it will turn the pulley I against the tension of the spring M, which in turn will draw backward the pulley I on the shaft A when the weight or power is removed from treadle or lever B, so that upon repeating the movement of lever or treadle B a rotary reciprocating motion will be imparted to pulley I. The backward movement of the pulley I is entirely independent of the shaft A; but through pawls O O and ratchets H H the forward movement of the pulley I imparts a corresponding forward movement to the shaft A. The pawls O O are pivoted to the sides of the pulley I on the pin $b$, which passes loosely through the radial slot $c$, made through the pulley I, and the pawls are formed with the toes $o$, and are made to move together by being arranged upon the rod $d$, which passes through both of the pawls and through the slot or opening G', made through the pulley I. The ends of the rod $d$ reach past the pawls O O, and upon them, against the outside of the pawls O O, are placed the rollers P P, which run upon the annular parts J J. The toes $o$ of the pawls O O reach in front of the rollers J J, so that owing to the locality of the rollers P P back of the toes $o$ $o$ and below the pivot $b$ of the pawls, and owing also to the weight of the pawls O O and rollers P P, and to the pivot $b$ moving in slot $c$, the friction of the rollers P P on the annular parts J J will, upon each downstroke of lever B and forward movement of the pulley I, retard the lower ends of the pawls, while the upper ends thereof will be carried forward, which movement at the proper time will cause the toes $o$ $o$ to be depressed into engagement with the ratchets H H. Upon the backward movement of the pulley I, the rollers P P being in contact with the annular parts J J, said rollers will be rotated reversely, or in the direction of the arrow, and parts J J, by the frictional contact, will tilt the pawls O O upward to throw their toes $o$ $o$ out of engagement with the ratchets H H, so that the backward movement of the pawls will be entirely out of contact with the ratchets, thus making the ratchet action almost entirely noiseless. In front of the pawls O O is placed the stop-pin $e$, which prevents the pawls, if carried in front of the shaft A, from swinging forward too far by gravity as they leave the ratchets H H upon the backward movement of the pulley I. Constructed in this manner, it will be seen that upon reciprocating the lever B the shafts A and C will be continuously revolved, and that the movement is practically noiseless, and that no springs are used about the ratchet action. It will also be seen that as the pawls O O work together, all lateral and uneven action of the parts is avoided, and that the pawls O O being arranged at the upper edge of the ratchets J J, the power is always applied to the best advantage.

Having thus described my invention, what I claim as new, and desire to secure by Letters Patent, is—

1. The pulley I, formed with the slot or opening G', in combination with the pawls O O, ratchets H H, annular parts J J, and rollers P P, placed upon rod d, that passes through the pawls and through the opening G', whereby the pawls are made to work together, substantially as described.

2. The pulley I, formed with the slot c, in combination with the pin b and pawls O O, pivoted upon the said pin, the pin passing through the slot c, substantially as described.

3. In a mechanical movement, the pawls O O, arranged on the opposite sides of the rotary reciprocating pulley I and placed upon rod d, whereby they are adapted always to move together, substantially as described.

4. The pawls O, pivoted at their outer ends to the rotary reciprocating pulley I, and provided with the rollers P, in combination with the ratchets H and annular parts J, substantially as and for the purposes described.

5. The ratchet H, cast with the annular part J, in combination with the pawls O, provided with rollers P, substantially as described.

FRANCIS W. GOODYEAR.

Witnesses:
 RALPH W. ELLIS,
 NEWRIE D. WINTER.